(12) United States Patent
Kearney et al.

(10) Patent No.: US 6,200,390 B1
(45) Date of Patent: Mar. 13, 2001

(54) SIMULATED MOVING BED BLOCK DISPLACEMENT PROCEDURE

(75) Inventors: Michael M. Kearney; Kenneth R. Peterson, both of Twin Falls; Michael W. Mumm, Hansen, all of ID (US)

(73) Assignee: Amalgamated Research, Inc., Twin Falls, ID (US)

( * ) Notice: Subject to any disclaimer, the term of this patent is extended or adjusted under 35 U.S.C. 154(b) by 0 days.

(21) Appl. No.: 09/341,402
(22) PCT Filed: Jan. 6, 1998
(86) PCT No.: PCT/US98/00115
 § 371 Date: Sep. 14, 1999
 § 102(e) Date: Sep. 14, 1999
(87) PCT Pub. No.: WO98/30724
 PCT Pub. Date: Jul. 16, 1998

Related U.S. Application Data
(60) Provisional application No. 60/034,191, filed on Jan. 7, 1997.

(51) Int. Cl.[7] .................................................. C13K 3/00
(52) U.S. Cl. ........................................... 127/46.3; 210/656
(58) Field of Search ............................. 127/46.3; 210/656

(56) References Cited

U.S. PATENT DOCUMENTS

| | | |
|---|---|---|
| 4,359,430 | 11/1982 | Heikkila et al. . |
| 4,412,866 | 11/1983 | Schoenrock et al. . |
| 5,102,553 * | 4/1992 | Kearny et al. .................... 210/659 |
| 5,127,957 | 7/1992 | Heikkila et al. . |

OTHER PUBLICATIONS

Copy of International Search Report dated Apr. 3, 1998.

* cited by examiner

Primary Examiner—David Brunsman
(74) Attorney, Agent, or Firm—Trask Britt

(57) ABSTRACT

A "block" of betaine is displaced from the circulation loop of an ion exclusion system configured as an SMB without disturbing the normal operation of the system. In practice, a betaine-concentrated fraction is withdrawn (17) from the circulating loop of the SMB while an equal volume of water is introduced (15) to the loop. The circulation loop thereby continues without disruption.

7 Claims, 2 Drawing Sheets

SIMULATED MOVING BED BLOCK DISPLACEMENT PROCEDURE

This is a 371 of PCT/US98/00115 filed Jan. 6, 1998, which is a continuation of provisional application 60/034,191 filed Jan. 7, 1997.

BACKGROUND OF THE INVENTION

1. Technical Field

This invention pertains to the control of a simulated moving bed (SMB). It is particularly directed to a block displacement procedure which may be applied, for example, to recover a betaine fraction from the circulation loop in an SMB of a sugar factory.

2. Background Art

U.S. Pat. No. 4,412,866 describes the operation of an SMB to separate the components of a feed stock. A resin bed is divided into a series of discrete vessels, each of which functions as a zone within a circulation loop. A manifold system connects the vessels and directs in appropriate sequence to each vessel each of the four media accommodated by the process; namely, feed stock, eluant, extract and raffinate. As applied to a sugar factory, a typical feed stock is sucrose solution, the eluant is water, the extract is an aqueous solution of sucrose and the raffinate is an aqueous solution containing nonsucrose, such as salts and high molecular weight compounds The largest single loss of sugar values from a typical sugar factory is attributable to molasses formation. Molasses comprises the byproduct (or waste) stream remaining after repeated crystalizations to recover purified sugar. This molasses is typically of such low purity that further crystallization procedures for the recovery of additional sugar are economically impractical. SMB arrangements similar to those disclosed by the '866 patent are used in sugar factories to process molasses; typically producing a product fraction of relatively high (e.g., 90%) purity and low ash content and a waste fraction, comprising 40–50% of the feed, of relatively low purity and high ash content. (As used in the sugar industry, "purity" specifies percent by weight sucrose of the solids contained in a sample, on a dry weight basis.) This waste fraction contains most of the betaine values of the molasses feed. Betaine, being the most abundant nitrogenous compound found in molasses, has been recognized as a commercially useful byproduct; notably for use in animal feeds.

U.S. Pat. No. 4,359,430 and 5,127,957 describe methods for the recovery of a betaine fraction from various sources, such as the molasses produced by a sugar factory. The '957 patent discloses a batch operation imposed upon an SMB system. The method involves shutting off all input and output streams to the SMB while maintaining circulation through the resin bed. Thereafter, water and/or molasses feed are introduced to displace betaine, sucrose and rest molasses from separate columns in the loop.

There remains a need for an improved method for the recovery of betaine from an SMB system. Ideally, betaine removal should be accomplished without disrupting the continuous operation of the system.

DISCLOSURE OF INVENTION

According to this invention, a "block" of betaine is displaced from the circulation loop of an ion exclusion system configured as an SMB without disturbing the normal operation of the system. In practice, a betaine fraction is withdrawn from the circulating loop while an equal volume of water is introduced to the loop. The circulation loop continues without disruption.

Broadly, the invention is applied to a simulated moving bed process for the recovery of sugar values from a circulating stream moving in a closed loop through and between a plurality of segregated resin beds wherein input streams of feed and eluant are introduced to the circulating stream and output streams of extract and raffinate are withdrawn from the circulating stream at respective locations in the loop, those respective locations of the input and output streams being determined by the requirements of the process. Inherently, there develops a fluid block in the circulating loop concentrated with respect to betaine values. That block may be referred to as "betaine-enriched," although it is more properly regarded as being concentrated with respect to betaine values, no such values being necessarily added to the circulating stream. The improvement of this invention comprises withdrawing at least a portion (referred to as a "betaine-enriched fraction") of the betaine-enriched block from the circulating stream. Such withdrawal is from a betaine recovery location in the loop. A volume of eluant, typically water, sufficient to compensate for the withdrawn portion is injected into the circulating stream, ideally immediately adjacent and downstream of the betaine recovery location. The betaine recovery location is generally situated between a first location in the loop at which eluant is introduced to the loop and a second location at which extract is removed from the loop. Simply stated, the invention provides a method for displacing a block of betaine from the circulation loop of an ion exclusion system configured as an SMB without disturbing the normal operation of the system. The method comprises withdrawing a betaine fraction from that circulating loop while simultaneously introducing an equal volume of water to that loop. Ordinarily, water is introduced to the loop downstream with respect to the withdrawal of the betaine fraction. It is recognized that every location in a circulating loop may be regarded as both upstream and downstream of every other location in the loop. The terms "upstream" and "downstream," as used in this disclosure have reference to the direction of flow of a circulating stream as it travels from the point of introduction of an input feedstock stream around the loop, back to that introduction point.

According to an illustrative embodiment of this invention, a betaine recovery procedure is applied to an SMB sugar recovery process in which a plurality of resin zones are arranged to receive flow in series. A circulation stream is caused to flow continuously at a basic flow rate through a loop including those zones and a connecting manifold system. The manifold system is configured to introduce an input feed stock stream to the circulation stream exiting a first resin zone as the circulation stream flows to a second resin zone located downstream in the circulation stream with respect to the first resin zone. The manifold system is further operated to withdraw an output raffinate stream from the circulation stream exiting the second resin zone. It further functions to introduce an input water stream to the circulation stream entering a fourth resin zone downstream in the circulation stream with respect to the first, second and a third said resin zone, and to withdraw an output extract stream from the circulation stream exiting the fourth resin zone. The manifold system is further operated to shift each of the feedstock, water, raffinate and extract streams, as a group, to other locations around the loop so that the feedstock stream is introduced in sequence to each of the four resin zones, while each of the other input and output streams are similarly advanced to maintain their respective positions in the loop, The recovery procedure comprises operating the manifold system to divert a betaine-enriched fraction from the circulation stream while simultaneously introducing a corresponding volume of water to the circulation stream at a location which maintains the basic flow rate in the loop. In most instances, the betaine-enriched fraction is diverted from the circulation stream at a location in the loop downstream from the introduction of the input water stream and upstream from the output extract stream.

BRIEF DESCRIPTION OF THE DRAWINGS

In the drawings, which illustrate what is currently regarded as the best mode for carrying out the invention.

BEST MODE FOR CARRYING OUT THE INVENTION

Figure 1:
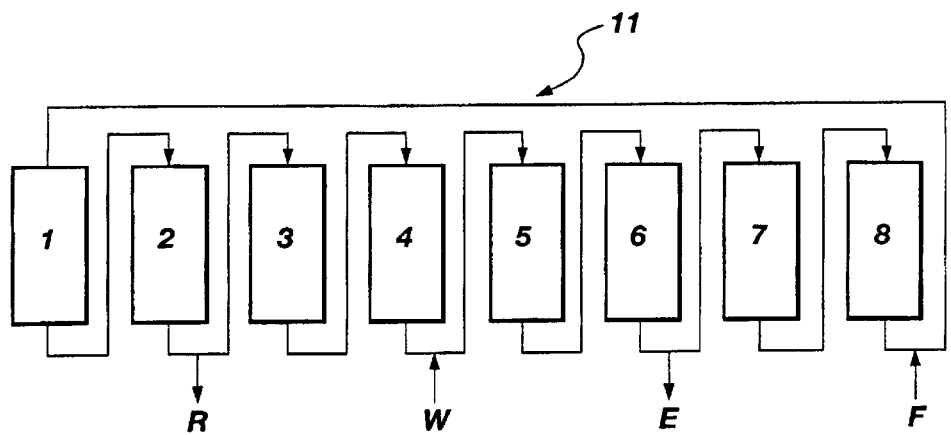
FIG. 1 is a simplified flow diagram of an SMB system typical of a conventional ion exclusion process.

As best illustrated by FIG. 1, eight cells (each comprising one or more vessels) are arranged to receive flow in series, all as explained in detail in U.S. Pat. No. 4,412,866. The cells are designated 1 through 8, respectively. A recycle, or circulation, stream flows continuously at a "basic" flow rate through the loop including the cells, 1–8, and a connecting manifold system, designated generally 11. The manifold 11 is configured to introduce feed stock F to the circulation stream exiting cell 8 as it flows to the top of cell 1, to withdraw raffinate R from the circulation stream exiting the bottom of cell 2, to introduce water W to the circulation stream entering the top of cell 5 and to withdraw extract E from the circulation stream exiting cell 6. These streams divide the total resin bed in the system into four zones, each of which comprises at least one cell.

In a typical SMB system, the manifold system 11 operates to shift each of the input, F and W, and each of the output, R and E, as a group to other locations around the loop. The specific SMB system illustrated is controlled through eight steps. Accordingly, feed stock F will, in turn, be introduced in sequence to the tops of each of columns 1 through 8, while each of the other input and output streams will be similarly advanced to maintain their respective positions in the loop.

Figure 2:
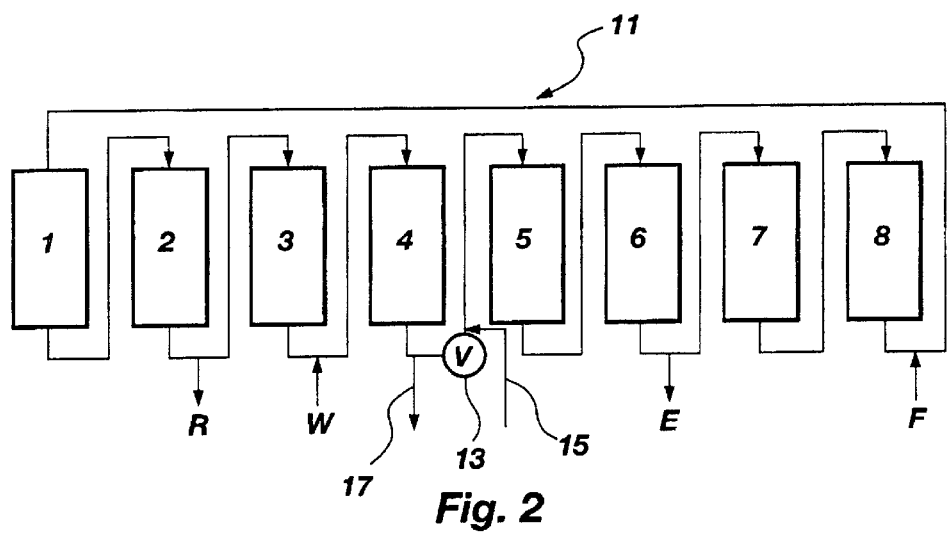
FIG. 2 is a simplified flow diagram similar to FIG. 1 of an SMB system modified to incorporate the invention.

The arrangement illustrated by FIG. 2, is typical of a conventional molasses treatment system, but is modified slightly to accommodate the removal of a betaine block in accordance with this invention. FIG. 2 illustrates the manifold 11 configured in accordance with this invention to introduce feed stock F to the circulation stream exiting cell 8 as it flows to the top of cell 1, to withdraw raffinate R from the circulation stream exiting the bottom of cell 2, to introduce water W to the circulation stream entering the top of cell 4 and to withdraw extract E from the circulation stream exiting cell 6. As illustrated, a valve 13 and conduits 15, 17, are positioned between cells 4 and 5. When it is desired to harvest a betaine-enriched "block" from the circulation stream, the valve 13 is operated to divert the flow from the bottom of column 4 out the conduit 17 rather than to the top of column 5. Simultaneously, a corresponding volume of water is introduced through the conduit 15 to the top of column 5.

Specifically, during betaine removal, the raffinate withdrawal location R is maintained two cells downstream from the cell receiving feed F; normal water introduction W is done one cell downstream from the raffinate withdrawal location R. Extract E removal is maintained three cells downstream from normal water W introduction, and feed F introduction is done two cells downstream from extract removal.

As illustrated by FIG. 2, betaine displacement is assumed to occur between cells 4 and 5 during step one of the SMB operation. The valve 13 is thus shown positioned between cells 4 and 5. Although the position of valve 13 could be advanced through the manifold system in progressive steps, such advancement is unnecessary, and of little potential advantage. It is sufficient for betaine removal to occur once in every eight or multiple of eight steps.

In a system structured and arranged as illustrated, and with the recycle rate being monitored by a flow meter positioned in the manifold between cells 8 and 1, the recycle set points for each step of the system are:

| STEP | RECYCLE FLOW RATE |
| --- | --- |
| 1 | Basic Rate + F |
| 2 | Basic Rate |
| 3 | Basic Rate |
| 4 | Basic Rate + E |
| 5 | Basic Rate + E |
| 6 | Basic Rate + E |
| 7 | Basic Rate + E − W |
| 8 | Basic Rate + F |

NOTE: F, E and W in the table refer to the flow rates of Feed, Extract and water, respectively.

For operational control, it is convenient to adopt the normal recycle rate of cell 4 as the set point rate for the flow of the betaine block out of the system through conduit 17. The same flow rate is used for a water block injected into the system through conduit 15. There is thus no disturbance to the normal flow rate set points throughout the SMB system, except for those caused by repositioning the raffinate R and water W valves with respect to the cells. Some water in addition to the normal water volume introduced at W during step 1 is required to compensate for the water contained in the betaine block being removed. This increased demand is typically about 20% greater than required for conventional operation.

SMB systems of the type illustrated are generally operated by software-driven controls, such as computer logic control (PLC) systems. In any event, the valve 13 may be set in its betaine block displacement mode during any selected portion of a step (e.g., step 1). It is ordinarily preferred for the displacement period to commence immediately, or at some delay, after commencement of the step, but to run until the end of the step. A short delay period, typically less than a minute, is sometimes required to achieve stabilization at the beginning of a step. Betaine concentration will generally be greater near the end of the step.

Figure 3:
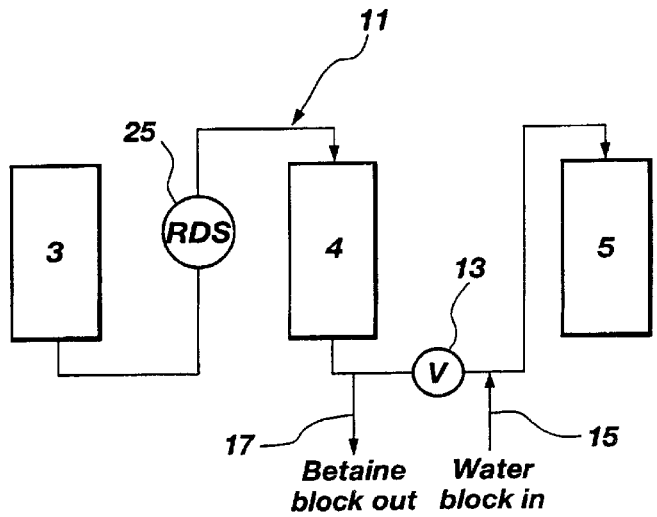
FIG. 3 is a simplified flow diagram illustrating the positioning of a refractometer in the system of this invention.

FIG. 3 illustrates the placement of a refractometer 25 in the manifold 11 between cells 3 and 4. So positioned, this instrument detects the "refractometer dry substance (RDS) content of the circulation stream in the manifold 11 just prior to entering cell 4. The extent of betaine buildup in the recycle prior to displacement can thereby be adduced. FIG.

4 is an RDS curve descriptive of a typical betaine block displaced from the system illustrated by FIG. 2. Typically, the fraction represented by the portion 18 of the curve is displaced to recover betaine. The portion 19 of the curve represents the extract phase, and the portion 20 of the curve represents the raffinate phase.

Figure 4:
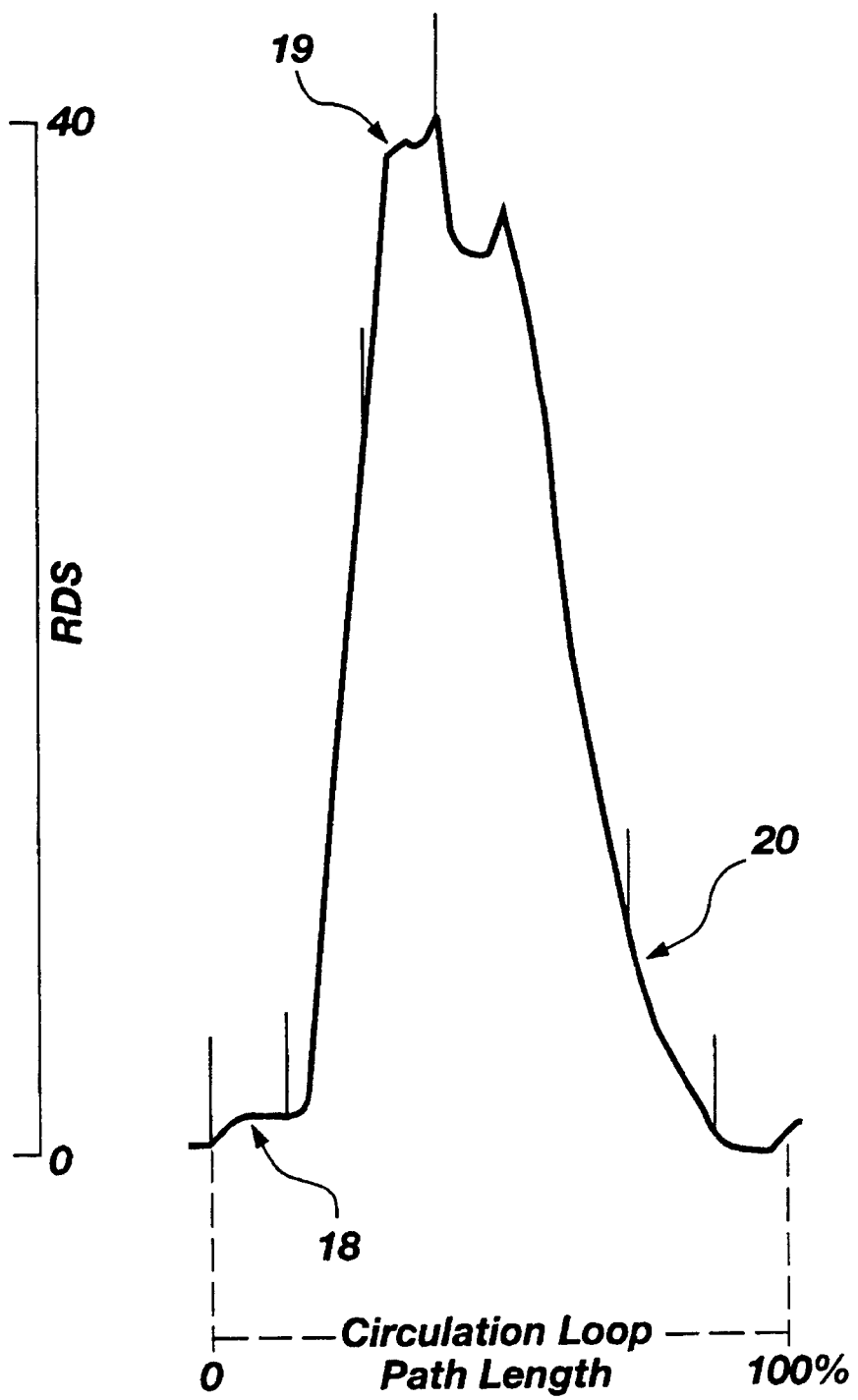
FIG. 4 is a typical RDS curve obtained from measurements taken by a refractometer positioned as illustrated by FIG. 3.

Polarimetric analysis of a sample taken from the betaine block of FIG. 4 revealed no sugar content. The purity of the Raffinate fraction may actually increase (e.g., 21–23 purity) as a consequence of betaine displacement. However, the overall non-sugar fraction of the operation, used for material balance purposes, comprises the composite of the raffinate and the betaine fractions. A typical analysis of such a composite is about 15 purity.

What is claimed is:

1. In a simulated moving bed process for the recovery of sugar values from a circulating stream moving in a closed loop through and between a plurality of segregated resin beds wherein input streams of feed and eluant are introduced to said circulating stream and output streams of extract and raffinate are withdrawn from said circulating stream at respective locations in said loop, said respective locations being determined by the requirements of said process, whereby inherently to develop a block in said circulating loop concentrated with respect to betaine values, the improvement which comprises withdrawing at least a portion of said block from said circulating stream from a betaine recovery location in said loop and injecting a volume of eluant sufficient to compensate for said portion into said circulating stream immediately adjacent and downstream of said betaine recovery location.

2. An improvement according to claim 1, wherein said simulated moving bed comprises a plurality of vessels, each containing an ion exchange resin, connected in series through a manifold system, whereby to provide said circulating loop, and said betaine recovery location is located between a first location in said loop at which eluant is introduced to said loop and a second location at which extract is removed from said loop.

3. An improvement according to claim 2 wherein said betaine recovery location is between a first said vessel and a second said vessel, said second vessel being located downstream in said loop with respect to said first vessel, said first location is upstream in said loop with respect to said first vessel and said second location is downstream in said loop with respect to said second vessel.

4. A method for displacing a block of betaine from the circulation loop of an ion exclusion system configured as an SMB without disturbing the normal operation of the system, comprising withdrawing a betaine fraction from said circulating loop while simultaneously introducing an equal volume of water to said loop.

5. A method according to claim 4, wherein said water is introduced to said loop downstream with respect to the withdrawal of said betaine fraction.

6. A betaine recovery procedure applied to an SMB sugar recovery process in which:
- a plurality of resin zones are arranged to receive flow in series,
- a circulation stream is caused to flow continuously at a basic flow rate through a loop including said zones and a connecting manifold system,
- said manifold system is configured:
  - to introduce an input feed stock stream to the circulation stream exiting a first said resin zone as said circulation stream flows to a second said resin zone located downstream in said circulation stream with respect to said first resin zone,
  - to withdraw an output raffinate stream from said circulation stream exiting said second resin zone,
  - to introduce an input water stream to said circulation stream entering a fourth said resin zone downstream in said circulation stream with respect to said first, second and a third said resin zone, and
  - to withdraw an output extract stream from said circulation stream exiting said fourth resin zone,
- said manifold system being operated to shift each of said feedstock, water, raffinate and extract streams, as a group, to other locations around the loop so that said feedstock stream is introduced in sequence to each of said resin zones, while each of the other said input and output streams are similarly advanced to maintain their respective positions in said loop,
- said recovery procedure comprising operating said manifold system to divert a betaine-enriched fraction from said circulation stream while simultaneously introducing a corresponding volume of water to said circulation stream at a location which maintains said basic flow rate in said loop.

7. A recovery procedure according to claim 6, wherein said betaine-enriched fraction is diverted from said circulation stream at a location in said loop downstream from the introduction of said input water stream and upstream from said output extract stream.

* * * * *